May 16, 1939.  H. BEIERSDORF  2,158,893
DOOR TENSION DEVICE FOR MOTOR VEHICLES
Filed Aug. 12, 1936   2 Sheets-Sheet 1
Fig. 1
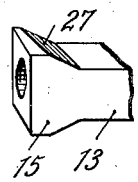
Fig. 4
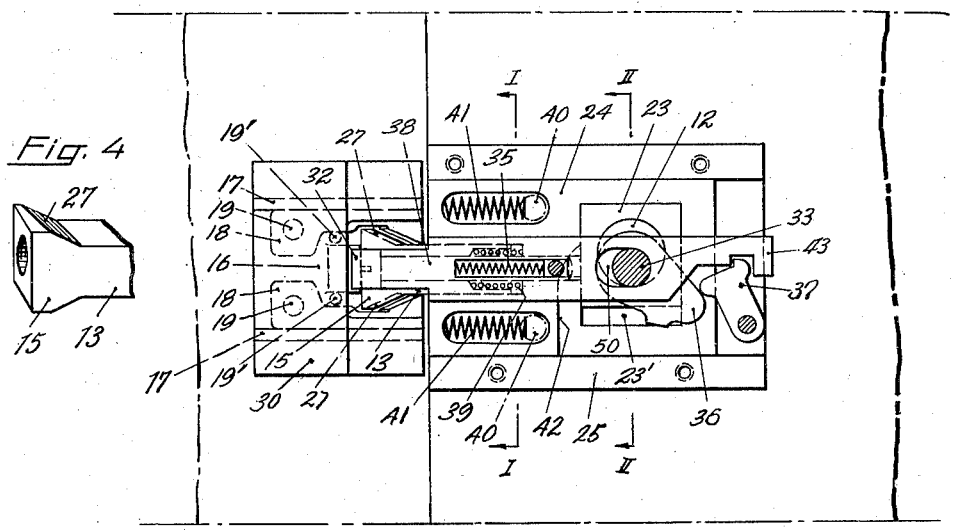
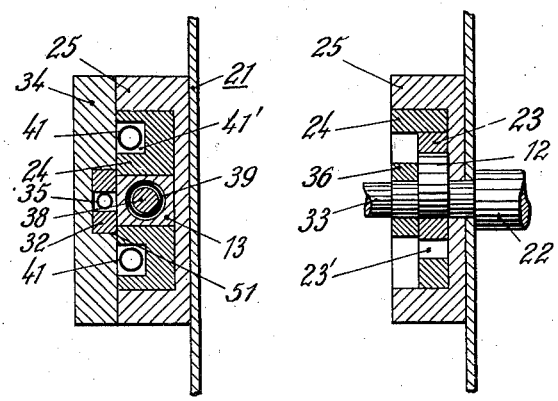
Fig. 2    Fig. 3
INVENTOR
H. Beiersdorf
By Robb & Robb
ATTORNEYS May 16, 1939.　　　H. BEIERSDORF　　　2,158,893
DOOR TENSION DEVICE FOR MOTOR VEHICLES
Filed Aug. 12, 1936　　2 Sheets-Sheet 2
Fig. 5
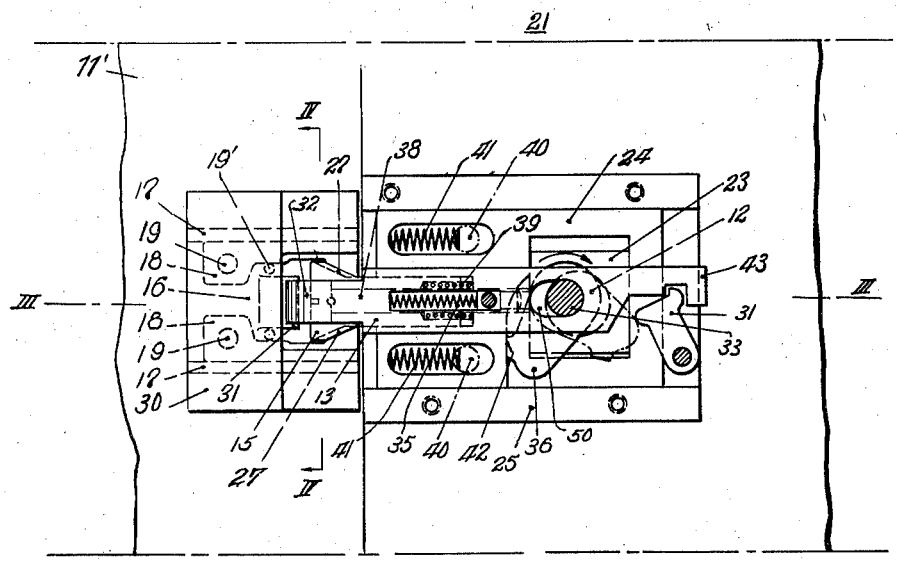
Fig. 6
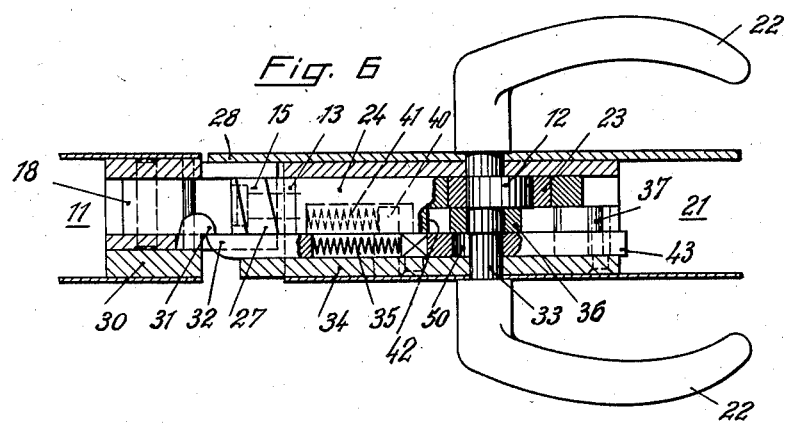
Fig. 7 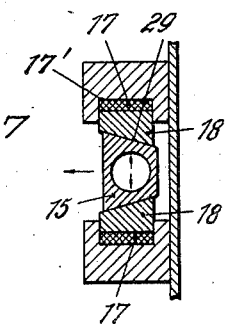 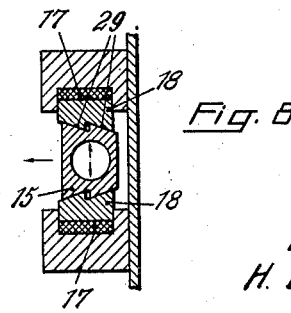 Fig. 8
INVENTOR
H. Beiersdorf
By Robb & Robb
ATTORNEYS Patented May 16, 1939

2,158,893

UNITED STATES PATENT OFFICE 2,158,893

DOOR TENSION DEVICE FOR MOTOR VEHICLES

Hans Beiersdorf, Berlin-Dahlem, Germany

Application August 12, 1936, Serial No. 95,662
In Germany August 13, 1935

10 Claims. (Cl. 292—169)

My invention relates to improvements in door tension devices for preventing the objectionable rattling of motor vehicle doors.

An object of my invention is the provision of a device of the above-indicated character having combined therewith a door lock of the standard type and a tensioning member therein provided with such surfaces as to create, when the door is brought into the operative position, tensioning forces acting both in the plane of the door and in the plane perpendicular thereto, thereby counteracting the rattling of the door in a most effective manner.

A further object of my invention is to provide a device of the above-indicated character having means, whereby the release of the tensioning member and the unlocking of the door are brought about by a single manipulation.

Other objects and advantages of my invention will be apparent during the course of the following description.

In the annexed drawings:

Fig. 1 is a fragmentary view of an automobile body equipped with a tension device made in accordance with my invention;

Fig. 2 is a vertical sectional view taken on the line I—I of Fig. 1;

Fig. 3 is a vertical sectional view taken on the line II—II of Fig. 1;

Fig. 4 is a part perspective view of the door tensioning member;

Fig. 5 is a view similar to that illustrated in Fig. 1 showing the device in operative position;

Fig. 6 is a horizontal sectional view taken on the line III—III of Fig. 5;

Fig. 7 is a vertical sectional view taken on the line IV—IV of Fig. 5;

Fig. 8 shows a sectional view of a modified form of the tensioning member according to my invention.

Referring to the drawings in detail, in which the same reference numeral designates the same part throughout, 11 denotes the wall partly broken off of an automobile body viewed from the inside, 21 the door and 22 the handles therefor. On the common shaft 33 carrying the handles 22 and having an eccentric 12 integral therewith is mounted a cam 36 engaging in the position shown a pivotally mounted lever 37. A slide block 23 cooperating with the eccentric 12 is disposed in a recess 23' arranged in a slide 24 and moves therein upon the rotation of the handle 22 in both directions in the plane of the door. The slide 24 is slidably arranged in a guide body 25 secured to the door 21 by screws (not shown) so as to move to and fro a distance equal to the stroke of the eccentric 12. The slide is under the action of compression springs 41 placed in recesses 41' provided therein, one end of the springs engaging bolts 40 (shown in dotted lines in Fig. 6) firmly secured to the housing 34 of a lock. A tensioning member, such as a square rod having a wedge-like head 27 fits in a corresponding hole arranged in the slide 24 and is so secured thereto by means of a flat fillister head screw 38 as to reciprocate in the plane of the door, a spring 39 pressing the rod 13 against the head of the screw 38. As will be seen from Figs. 4 and 7 the outer opposite surfaces 27 of the wedge-like head of the rod 13 are so inclined as to converge both towards a plane perpendicular to the rod and towards a second plane perpendicular to the first mentioned plane. In other words, each camming face 27 of the tensioning member is inclined in one direction longitudinally and in another transversely of said member so that the tensioning forces act in two directions to hold the door against vibration when the tensioning member is engaged with its keeper device now to be described. In the door jamb there is secured a keeper 30 in which two metallic jaws 18 are rotatably mounted on pins 19 and held in a position by the stops 19' to permit the wedge-like head 15 when closing the door to slide therebetween. The inner opposite surfaces of the jaws 18 are so inclined as to conform to the inclination of the surfaces of the wedge-like head 15. The jaws on being forced apart by the head 15 are pressed against rubber straps 17 (Fig. 7) arranged in the grooves 17'. A catch 31 secured to the keeper 30 and arranged between the jaws 18 engages a catch bolt 32. The catch bolt 32 which is under the action of a compression spring 35 extends as shown in Fig. 6 and Fig. 2 in a recess 51 arranged in the cover plate of the housing 34, and is provided with a slot 50 through which passes the shaft 33 of the handle 22. The portion 43 of the catch bolt extending beyond the shaft 33 is designed in the form of a hook which cooperates with the pivotally mounted lever 37.

In the modified form of the tensioning member shown in Fig. 8 the outer opposite inclined surfaces of the wedge-like head 15 and the inner opposite surfaces of the jaws 18 are so stepped off as to establish a tight contact between the surfaces. In this case the surfaces may be inclined to a greater extent, thereby considerably increasing the tensioning forces acting perpendicularly to the plane of the door.

The operation of my improved tensioning device is as follows:

When the door is closed as shown in Fig. 1, both the slide 24 and, therefore, the wedge 15 are, owing to the action of the spring 41, in the left-hand end position, the eccentric 12 being substantially in the central position; i. e., the center of the eccentric 12 and that of the shaft 33 lie on a line perpendicular to the axis of the rod 13. In this position the wedge 15 when closing the door may slide without any hindrance between the metallic jaws 18, the catch bolt 32 on slipping over the catch 31 being brought at the same time into engagement with the latter as will be seen from Fig. 6. The handle 22 is then rotated in clockwise direction to cause the wedge 15 under the action of the eccentric 12 to move to the right, thereby establishing a tight contact between the inclined surfaces of the wedge 15 and the corresponding surfaces of the metallic jaws 18. The handle 22 is rotated somewhat more than 90° so that the eccentric is rotated beyond its dead center point. In this position a self-locking of the slide 24 is attained, since the cam 36 which moves in a recess arranged in the slide 24 engages the inner wall 42 of the recess as disclosed in Fig. 5 so that a loosening of the parts held under tension is not to be feared. If the door is to be opened again the handle is rotated in the counterclockwise direction, thereby bringing the wedge 15 out of contact with the metallic jaws 18. As soon as the eccentric has attained its initial position the cam 36 strikes the lever 37, so that upon a further rotation of the handle in the counterclockwise direction the cam 36 actuates the lever 37 to cause the catch bolt 32 to move in a direction opposite to the force of the spring 35, and the door may be reopened. On releasing the handle 22 the catch bolt 32 returns to its initial position under the action of the spring 35.

I claim as my invention:

1. A door tension device for motor vehicles, comprising in combination with a door lock having means for holding said device in a locking position when the door is closed, a keeper mounted in the door jamb and having arranged therein a pair of pivotally mounted jaws arranged in spaced relation, a lock casing adapted to be secured in the door, and a tensioning member and catch bolt each slidably mounted therein, said tensioning member and catch bolt having common actuating means whereby release of the tensioning member from said jaws and the disengagement of the catch bolt from the keeper is effected substantially at the same time.

2. In door tensioning mechanism for vehicles, a casing, a tensioning member movably mounted therein, and having a longitudinally and transversely inclined camming face, a keeper device having means provided with a face corresponding to said tensioning member camming face for cooperation therewith, and means for actuating said tensioning member to cause cooperating tensioned engagement between the inclined faces of the tensioning member and keeper means thereby producing tensioning forces acting longitudinally and transversely of said tensioning member.

3. In door tensioning mechanism for vehicles, a casing, a tensioning member movably mounted therein and provided with a head having a camming face inclining in two directions, a keeper device including a member with which the head aforesaid is engageable when the vehicle door is closed, said keeper member having a contact face conforming to the camming face of the tensioning member, handle-operated means for shifting the tensioning member into the engaging position exerting tension both longitudinally and transversely of the said member and for holding said keeper device and tensioning members in such position.

4. Door tensioning mechanism as set forth in claim 3 wherein the handle-operated means comprises an eccentric for shifting the tensioning member and a stop member for holding the eccentric in past dead center position.

5. Door tensioning mechanism as set forth in claim 3 combined with latch means for holding the door in closed position while the tensioning engagement is produced by the tensioning member.

6. A door tension device for motor vehicles comprising in combination with a door lock having means for holding said door in a locking position when the door is closed, a lock casing adapted to be secured in said door, a tensioning member slidably mounted in said casing and having a wedge-shaped head, the contact surfaces of said head being so inclined as to converge towards two planes perpendicular to each other, a keeper mounted in the door jamb and having arranged therein resilient members and a pair of spaced jaws in contact therewith, the contact surfaces of said jaws being so inclined as to conform to the inclined contact surfaces of said head, whereby sliding movement of said tensioning member when said door is brought into the closed position creates wedging forces acting in two directions perpendicular to each other to expand the jaws so as to exert a pressure on the resilient members.

7. A door tension device for motor vehicles in combination with a door lock having means for holding said door in a locking position when the door is closed, a lock casing adapted to be secured in said door, a tensioning member slidably mounted in said casing and having a stepped-off wedge-shaped head, the contact surfaces of said head being so inclined as to converge towards two planes perpendicular to each other, a keeper mounted in said door jamb and having arranged therein resilient members and a pair of spaced jaws in contact therewith, the contact surfaces of said jaws being stepped off and so inclined as to conform to the inclined contact surfaces of said head, and means for sliding said tensioning member when said door is brought into the closed position, whereby wedging forces are created acting in two directions perpendicular to each other to expand the jaws so as to exert a pressure on the resilient members.

8. In door tensioning mechanism of the class described, the combination of a casing, a tensioning member slidably mounted therein and having a wedge-shaped head, a cooperating latch bolt in said casing, a keeper device having means with which said tensioning member and latch bolt are engageable, and common actuating means for simultaneously shifting said parts into release position relative to the keeper device, said common actuating means comprising an eccentric, and a stop arm movable in one direction to limit movement of the tensioning member and in the opposite direction to actuate the latch bolt.

9. In door-operating apparatus, the combination of a latch bolt, keeper means engageable by the latch bolt, means for forcing said door closed and for counteracting vibrations while the latch bolt is in engagement with the keeper means, said last-named means comprising wedging means having keeper engaging surfaces each inclined in a direction transverse to the door and in a direction substantially vertically thereof, and means for maintaining said wedging means in tensioned engagement with the keeper means to perform the door closing and vibration counteracting functions as aforesaid.

10. In door-operating apparatus, the combination of a latch bolt, keeper means engageable by the latch bolt, means for forcing said door closed and for counteracting vibrations while the latch bolt is in engagement with the keeper means, said last-named means comprising a wedging bar having each of its opposite sides inclined in a directon transverse to the door and in a direction substantially vertically thereof, and means for maintaining said wedging bar in tensioned engagement with the keeper means to perform the door closing and vibration counteracting functions as aforesaid.

HANS BEIERSDORF.